United States Patent [19]
Brinck et al.

[11] Patent Number: 5,370,296
[45] Date of Patent: Dec. 6, 1994

[54] APPARATUS FOR FORMING CIRCULAR WELD JOINTS

[75] Inventors: Joseph A. Brinck, 5545 Annamarie Ct., Cincinnati, Ohio 45247; Steven K. Price, Cincinnati, Ohio

[73] Assignee: Joseph A. Brinck, Cincinnati, Ohio

[21] Appl. No.: 125,569

[22] Filed: Sep. 23, 1993

[51] Int. Cl.⁵ .................... B23K 9/12; B23K 37/02
[52] U.S. Cl. ........................ 228/29; 228/45; 219/60.2; 219/125.11
[58] Field of Search .............. 228/29, 32, 45; 219/125.11, 60.2

[56] References Cited

U.S. PATENT DOCUMENTS

| | | | |
|---|---|---|---|
| 3,064,120 | 11/1962 | Ache | 219/60.2 |
| 3,296,411 | 1/1967 | Woolsey et al. | 219/125.11 |
| 3,806,693 | 4/1974 | Miller | 219/60.2 |

FOREIGN PATENT DOCUMENTS 2053059A 2/1981 United Kingdom ............ 228/9

Primary Examiner—P. Austin Bradley
Assistant Examiner—Jeffrey T. Knapp
Attorney, Agent, or Firm—Wood, Herron & Evans

[57] ABSTRACT

An apparatus for forming circular weld joints includes a support frame, a motor having a primary drive shaft, a secondary drive shaft coupled to the primary drive shaft, and a hub mounting plate affixed to the support frame. A floating hub assembly is included and a chuck which is coupled to the secondary drive shaft and has at least one radially offset receiving bore. A MIG-type welding tip is rotated in a circular path upon activation of the motor to form a circular weld. Stabilizing guide members and depth guides are provided which extend outwardly from a support frame to ensure proper positioning of the welding tip during the weld forming operation.

11 Claims, 3 Drawing Sheets

APPARATUS FOR FORMING CIRCULAR WELD JOINTS

FIELD OF THE INVENTION

The present invention is directed to a welding apparatus, and more particularly to an apparatus for forming circular weld joints.

BACKGROUND OF THE INVENTION

The fabrication of certain types of heat exchangers requires welding a plurality of heat exchange tubes to end sheets, referred to herein as tube sheets. Welding the heat exchange tubes to tube sheets requires forming a circular weld joint at the location where the tube ends pass through the tube sheets. Typically, each tube end is flush with the outer surface of the tube sheet and the weld joint is formed at that location to rigidly affix each tube to the tube sheets and to create a seal. Welders for such applications are known in the art. Typically, such welders are very expensive and complicated in structure and operation since the welds being formed are subject to relatively high pressures and their integrity is critical. In some applications, however, the heat exchanger is not subject to high pressure during use, and thus the integrity and seal of the weld joint is less of a concern. Thus, for certain applications, there has developed a need in the art for a welder apparatus for forming circular weld joints which is relatively inexpensive, yet provides satisfactory results.

SUMMARY OF THE INVENTION

In its broadest aspects, the present invention is directed to an apparatus for forming circular weld joints, and under certain modes of operation for spot welding operations. The apparatus of the invention is capable of accommodating differing tube spacings in a tube sheet, as well as forming circular welds of different diameters, as required in the particular application.

In one embodiment, the apparatus of the present invention includes a support frame, a motor which includes a primary drive shaft, a secondary drive shaft coupled at one end to the primary drive shaft, and a hub mounting plate affixed to the support frame. A floating hub assembly is mounted to the hub mounting plate, and the secondary drive shaft passes through the floating hub. A chuck is coupled to the other end of the secondary drive shaft and the chuck, which is generally cylindrical, has at least one longitudinal receiving bore which is radially offset from the longitudinal center axis of the chuck. The apparatus further includes a coupling shaft which is received in a longitudinal receiving bore of the chuck. The other end of the coupling shaft is received in an axial bore of the welder barrel. The welder barrel has a welding tip at its opposite end. Finally, the apparatus includes a trigger-type mechanism for activating the motor and the welding tip to form a circular weld.

In operation, when the motor is activated, the rotation of the primary drive shaft is translated through the secondary drive shaft to the chuck. Because the coupling shaft is received in the chuck, but radially offset from the axis thereof, the coupling shaft and the welder barrel travel in a circular path, thereby forming a circular weld joint.

The apparatus is intended to be used for forming circular welds in welding tubes to a tube sheet, although it may have other applications. A preferred embodiment of the invention includes certain additional features which are particularly useful and advantageous for welding a plurality of tubes to a tube sheet.

More particularly, the chuck may include a plurality of receiving bores, each of which is radially offset a different distance from the longitudinal axis of the chuck. Thus, depending on which receiving bore the coupling shaft is received in, the diameter of the circular weld which is formed can be varied. Additionally, the floating hub assembly, through which the secondary drive shaft passes, permits the hub to be adjusted radially in any direction to accommodate variations in the hole spacings in the tube sheet. Furthermore, the welding apparatus may include a plurality of stabilizing guide members adjacent the welding tip to properly position and stabilize the tip during the welding operation. The guide members are affixed to a guide member support frame which includes support arms, a spacer bar and a support ring. The support ring is rotatably coupled to the hub mounting plate to permit rotation of the support frame and guide members so they can be properly oriented to accomplish the welding operation on virtually every tube in a tube and tube sheet assembly. The guide member support frame may further include at least one depth guide which extends outwardly therefrom in a direction parallel to the stabilizing guide members to further ensure proper positioning of the welding tip during the weld forming operation. Finally, the rotatable support ring may include a spring-loaded locking pin for engagement with a desired one of a number of receiving holes in the hub mounting plate to lock the support ring in a desired rotational orientation.

Further features and advantages of the present invention will become apparent to persons skilled in the art upon review of the detailed description taken in conjunction with the drawings.

DETAILED DESCRIPTION OF THE INVENTION

Figure 1:
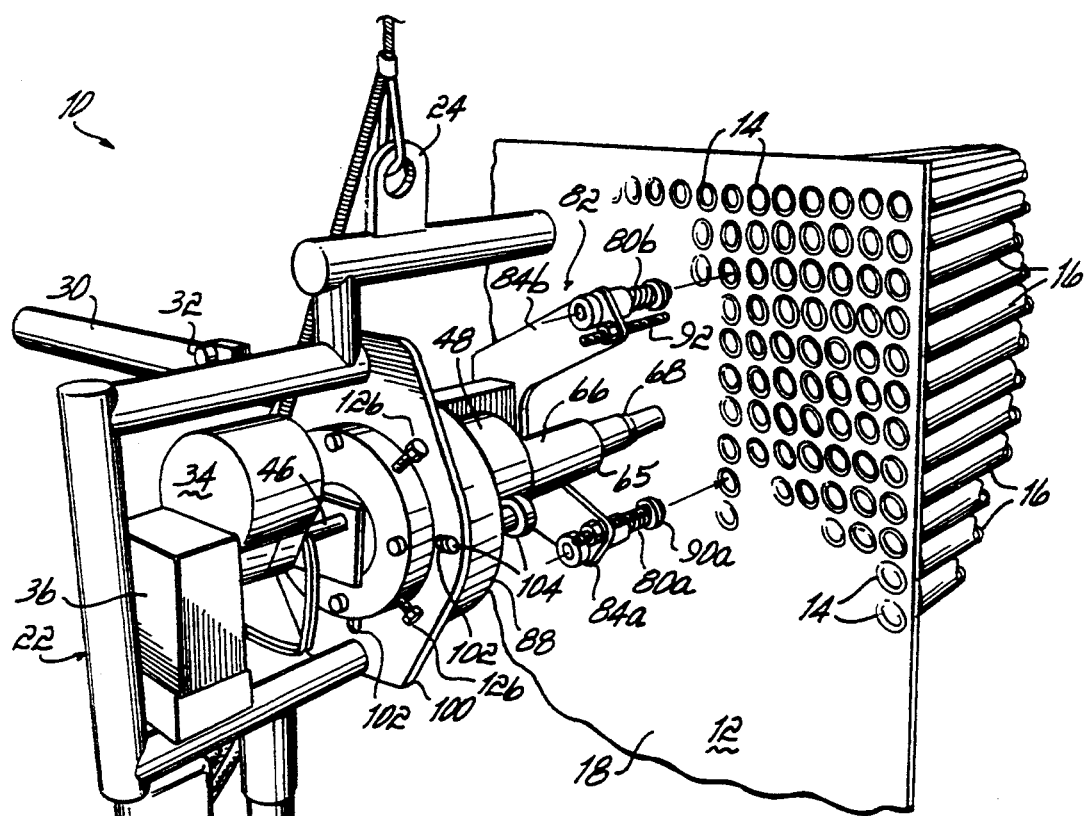
FIG. 1 is a perspective view of the present invention in its operational environment.

The circular weld-forming apparatus of the present invention, designated generally as 10, is designed to form circular welds for fabricating tube and sheet heat exchangers. FIG. 1 shows the welder apparatus 10 just prior to engagement with a tube sheet 12, which has a plurality of holes 14, each of which receives a heat exchange tube 16 therein. As shown in greater detail in FIGS. 4 and 5, heat exchange tubes 16 typically pass through holes 14 in tube sheet 12 and are flush with the outer surface 18 thereof. Apparatus 10 then forms a circular weld joint or bead 20 at the junction of each tube and sheet.

Again with reference to FIGS. 1 and 2, welder apparatus 10 generally comprises a support frame 22 which may consist of a plurality of steel or high strength plastic tubular elements welded or otherwise suitably secured together to provide a support frame. In particular frame 22 may include a support ring 24 which allows the entire device to be suspended, thus facilitating its use by a welder operator. Support frame 22 also includes a handle 26 with a trigger 28 for automatic operation of the welder apparatus to form a full circular weld. A guide handle 30 which forms a further portion of the support frame 22, includes a switch 32 for controlling the welder to perform spot welding rather than circular welding. Thus, by placing switch 32 in the desired operative position, welder 10 is used either to perform its intended circular welding function or to provide touch-up spot welding.

Figure 2:
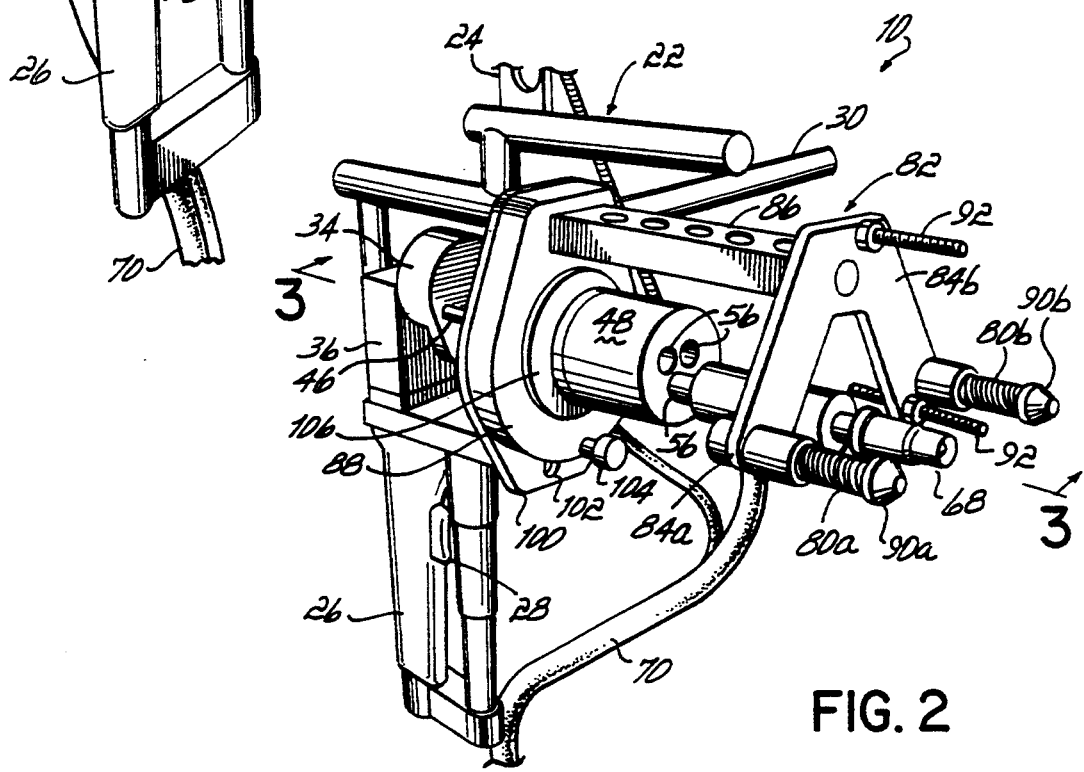
FIG. 2 is an alternative perspective view of the apparatus of the present invention.
Figure 3:
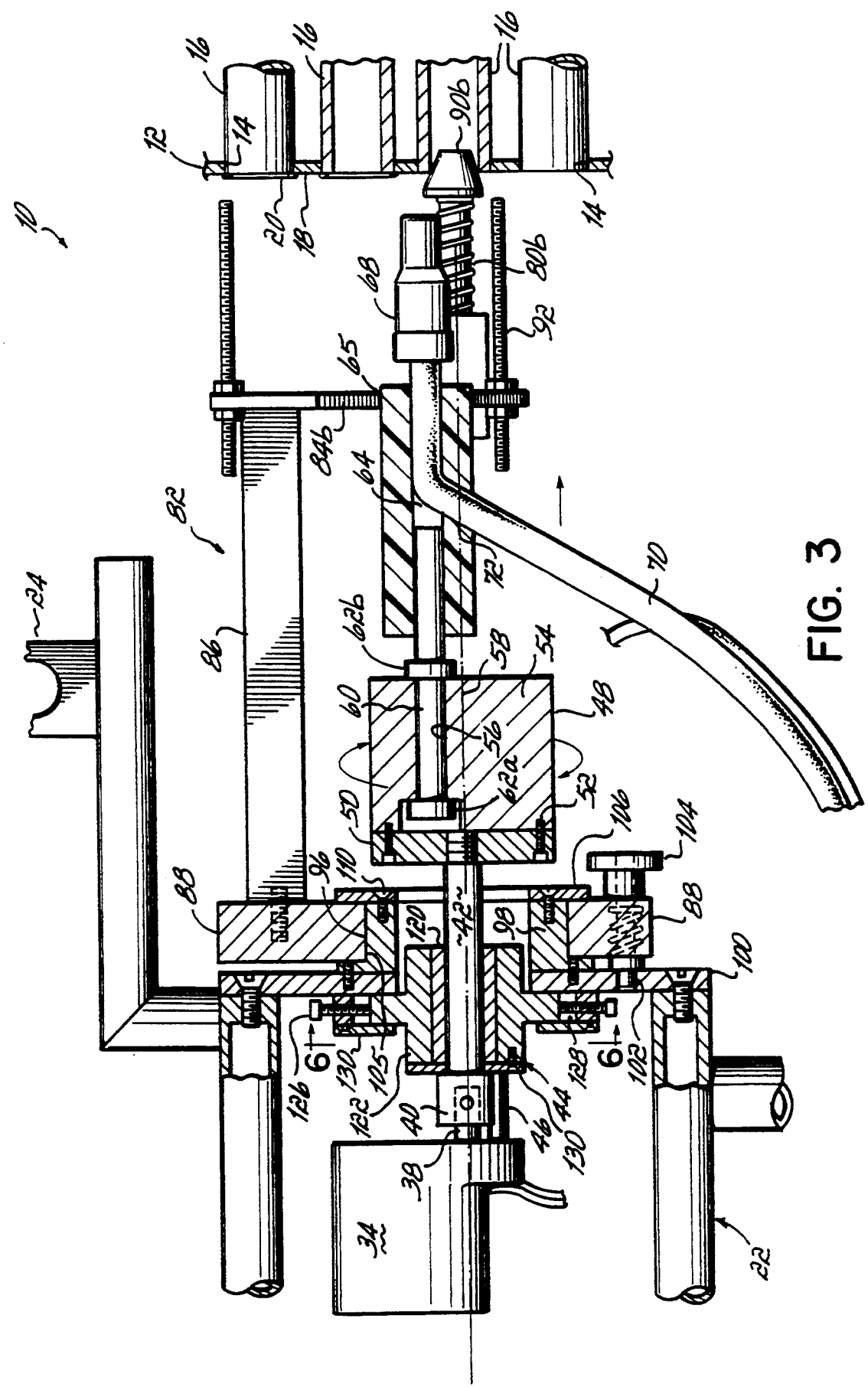
FIG. 3 is a cross-sectional view partially in elevation taken on line 3—3 of FIG. 2.

With particular reference to FIG. 3, welder 10 further includes a motor of any suitable type (one example of which is model H, sold by the Bowman Electric Products Co. of Chicago, Ill. Motor 34 is operatively connected to trigger activator 28 by means of timing control box 36 (see FIGS. 1 and 2), which controls rotation of the welding tip. Motor 34 includes a primary drive shaft 38 extending outwardly therefrom which is coupled by means of collar 40 to a secondary drive shaft 42. Secondary drive shaft 42 passes through a floating hub assembly designated generally as 44, which will be described in greater detail hereinbelow. Motor 34 is supported rigidly by motor stand-off rods 46 which are affixed to floating hub assembly 44 and to the motor casing 34.

Secondary drive shaft 42 is coupled to chuck 48, which comprises a cap 50 affixed by machine screws 52 to chuck body 54. Chuck body 54 has at least one longitudinal receiving bore 56 which is radially offset from the longitudinal axis 58 of chuck 48. In a preferred embodiment, chuck body 54 is provided with a plurality of receiving bores 56 (see FIG. 2) each of which is radially offset a different distance from the longitudinal axis 58 of chuck 48 for a purpose to be described hereinafter. Coupling shaft 60 is received in a desired receiving bore 56 and held in place by means of collars 62a and 62b. Coupling shaft 60 can be released and placed in a different receiving bore 56 simply by removing cap 50 and collar 62a, inserting shaft 60 in the desired bore 56, and replacing collar 62a and cap 50.

The opposite end of coupling shaft 60 is received in an axial bore 64 which passes longitudinally through welder barrel 66. The distal end 65 of welder barrel 66 retains welding tip 68. In welding apparatus 10, the welding head itself is preferably a MIG (metal inert gas)-type welder of a type well known in the art. Feed line 70 for the welding wire and gases passes into welder barrel 66 by means of a transverse opening 72 and is then fed into axial bore 64. Preferably, welder barrel 66 is made of an insulated plastic for electrical insulation. As in known MIG-type welders the wire (not shown) for welding is automatically fed through welder tip 68. The details of the structure and operation of MIG-type welders are known to persons skilled in the art.

Figure 4:
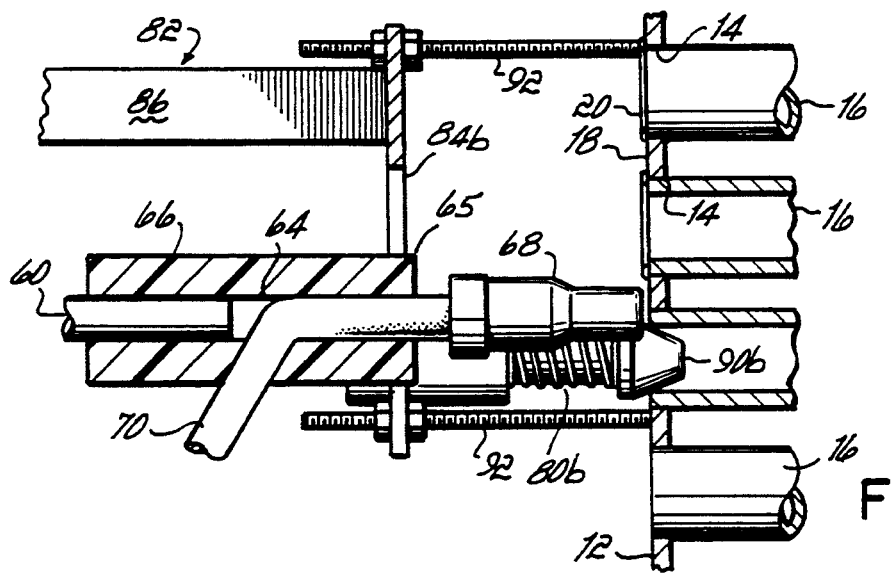
FIG. 4 is a side elevation, in partial cross-section, showing the welder tip portion of the present invention in operative engagement with a tube and tube sheet assembly.
Figure 5:
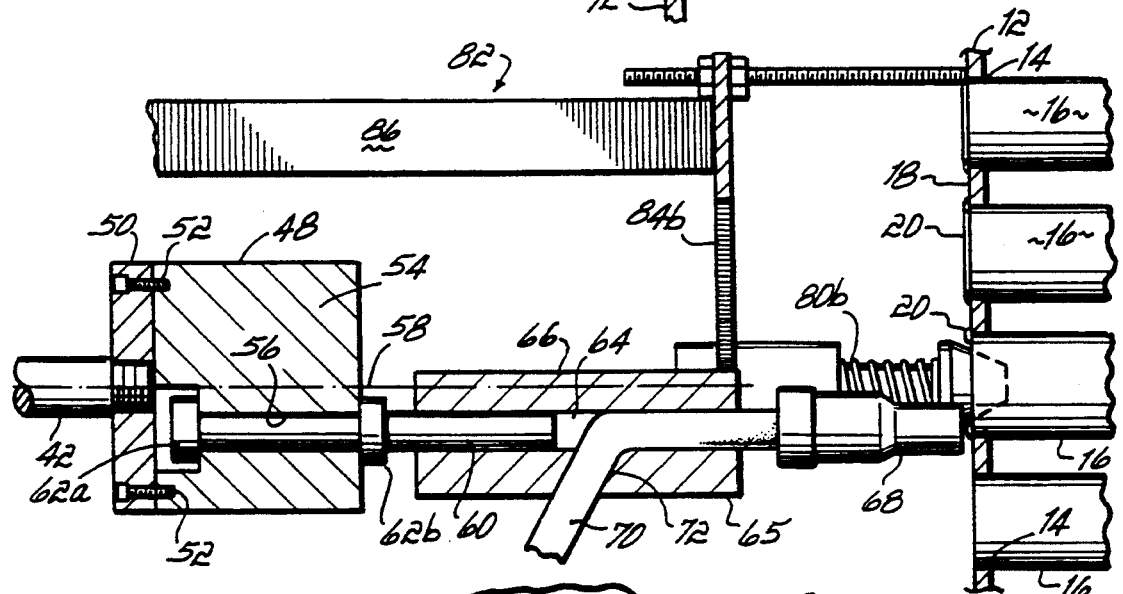
FIG. 5 is generally similar to FIG. 4 and shows the welder tip rotated 180° from that shown in FIG. 4.

As will be appreciated, the rotation of primary drive shaft 38 is translated via secondary drive shaft 40 to chuck 48 which rotates about its longitudinal axis 58. Due to the offset from chuck center line axis 58 of coupling shaft 60, coupling shaft 60, welder barrel 66, and thus welding tip 68 travel in a circular path. FIGS. 4 and 5 show welding tip 68 after 180° of rotation. By selecting the appropriate receiving bore 56 in chuck body 54, a circular weld of the desired diameter can be formed. Thus, to provide the adaptability of the present invention to form welds of different diameters, multiple receiving bores are provided in chuck body 54, each of which is radially offset a different distance from the longitudinal axis 58.

As shown most clearly in FIGS. 2 and 3, welder apparatus 10 preferably includes a pair of stabilizing guide members 80a and 80b which are affixed to a guide member support frame 82. The support frame 82 comprises support arms 84a and 84b, each of which has affixed to it a respective guide member 80a and 80b. Support frame 82 further includes a spacer bar 86 and a support ring 88. Guide members 80a and 80b as shown have tips 90a and 90b, respectively, which are frustoconical and are designed to be received in a heat exchange tube 16. By inserting guide member tips 90a and 90b into an appropriate pair of spaced apart tubes (see FIG. 1), welder apparatus 10 is stabilized and welding tip 68 is guided into the correct position with respect to the tube which is to be welded to the tube sheet 12 (see FIG. 4). Although the Figures show two such guide members, it will be appreciated that one or more additional guide members can be utilized. A further feature of the guide members is that they are spring-loaded and thus will deflect somewhat upon insertion into the respective tubes. To ensure that the welder tip is correctly positioned adjacent the tube and tube sheet during weld forming, one or more depth guides 92 are provided which extend outwardly from support arms 84a and 84b parallel to guide members 80a and 80b. The depth guides 92 further ensure proper positioning of the welding tip 68 during the weld forming operation, as shown particularly in FIGS. 4 and 5.

With reference to FIGS. 2 and 3, support ring 88 includes a circular aperture 96 for receiving annular shoulder flange 98 of hub mounting plate 100, which is rigidly secured to the support frame 22. Support ring 88 is designed to be rotatable about annular shoulder flange 96. Hub mounting plate 100 preferably includes a plurality of circumferentially spaced receiving holes 102 (as best shown in FIG. 1) and support ring 88 includes a spring-loaded locking pin 104 for engagement with one of the receiving holes 102 to lock the support ring and thus the entire guide member support frame 82 in a desired rotational orientation. For example, to rotate guide member support frame 82 from the orientation shown in FIG. 2 to that shown in FIG. 1, which is 90° of rotation, an operator would simply retract spring-loaded locking pin 104 from receiving hole 102, rotate the support frame 82 (including guide members, etc.) and re-insert the locking pin 104 in an appropriate receiving hole to lock guide member support frame 82 in the desired rotational orientation. This allows welding to take place for tubes 16 which are located in tube holes 14 along the edge of a tube sheet 12. Support ring 88 is captured and held in place (rotatably) in annular channel 105 by means of circular face plate 106 which is attached to the annular shoulder flange 98 by machine screws 110.

Figure 6:
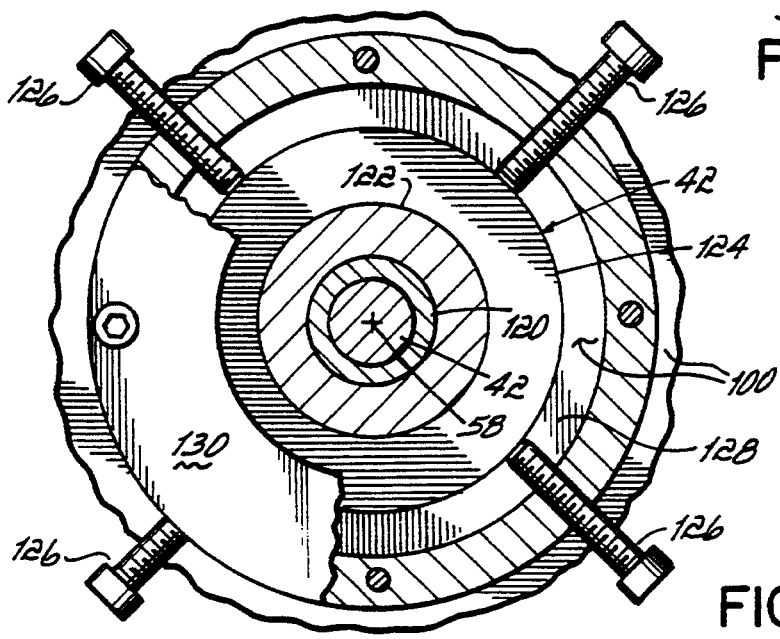
FIG. 6 is a cross-sectional view taken on line 6—6 of FIG. 3 showing the floating hub assembly of the apparatus of the present invention.

Floating hub assembly 44 will now be described with specific reference to FIGS. 3 and 6. Secondary drive shaft 42 passes through the center of bearing sleeve 120, which in turn is frictionally fitted in the body of hub member 122. Hub member 122 is generally cylindrical, but includes a circumferential flange 124 about its outer perimeter approximately centrally along its longitudinal axis. This can be seen particularly in FIG. 3. Hub assembly 44 is capable of "floating" by means of adjusting one or more of the plurality (preferably four) set screws 126. Thus hub member 122 can float in the annular space 128 defined by L-shaped annular cover plate 130 and hub mounting plate 100. One benefit of the floating hub 44 is that it permits adjusting the welding tip 68 relative to guide members 90a and 90b, thus accommodating variations in tube spacings.

While a preferred embodiment of the welding apparatus of the present invention has been described herein, various changes and modifications thereto will become apparent to persons skilled in the art. Thus, the scope of the present invention is not meant to be limited by or to the preferred embodiment, but is to be accorded a scope as defined by the appended claims.

What is claimed is:

1. Apparatus for forming circular weld joints, comprising:
   a support frame;
   a motor which includes a primary drive shaft;
   a secondary drive shaft having a first end coupled to said primary drive shaft;
   a hub mounting plate affixed to said support frame;
   a floating hub assembly mounted to said hub mounting plate, said secondary drive shaft passing through said floating hub;
   a chuck coupled to a second end of said secondary drive shaft, said chuck having at least one longitudinal receiving bore radially offset from the longitudinal axis of said chuck, said at least one receiving bore being adapted to receive a coupling shaft;
   a coupling shaft having a first end received in said receiving bore of said chuck;
   a welder barrel, which includes an axial bore and a welding tip, a second end of said coupling shaft received in said axial bore of said welder barrel; and
   means for activating said motor and said welding tip to form a circular weld.

2. A welding apparatus according to claim 1 wherein said chuck includes a plurality of receiving bores each of which is radially offset a different distance from said longitudinal axis of said chuck such that said welding apparatus is capable of forming circular welds of different diameters.

3. A welding apparatus according to claim 1 further comprising a plurality of stabilizing guide members adjacent said welding tip to properly position and stabilize said tip during formation of a circular weld.

4. A welding apparatus according to claim 3 wherein said guide members are affixed to a guide member support frame comprising support arms, a spacer bar and a support ring, said support ring rotatably coupled to said hub mounting plate, and said spacer bar spacing said support arms from said support ring.

5. A welding apparatus according to claim 4, said guide member support frame further comprising at least one depth guide extending from said support arms in a direction parallel to said stabilizing guide members to further ensure proper positioning of said welding tip during formation of a circular weld.

6. A welding apparatus according to claim 5 wherein said support ring includes a circular aperture for receiving an annular shoulder flange of said hub mounting plate, said support ring being rotatable about said annular shoulder flange.

7. A welding apparatus according to claim 6 wherein said hub mounting plate includes a plurality of circumferentially spaced receiving holes and said support ring includes a spring-loaded locking pin for engagement with one of said receiving holes to lock said support ring in a desired rotational orientation.

8. Apparatus for welding tubes to a tube sheet, comprising:
   a support frame;
   a motor which includes a primary drive shaft;
   a secondary drive shaft having a first end coupled to said primary drive shaft;
   a hub mounting plate affixed to said support frame;
   a floating hub assembly mounted to said hub mounting plate, said secondary drive shaft passing through said floating hub, and said floating hub assembly for accommodating variations in the spacing of the tubes to be welded to the tube sheet;
   a chuck coupled to a second end of said secondary drive shaft, said chuck having at least one longitudinal receiving bore radially offset from the longitudinal axis of said chuck, said at least one receiving bore being adapted to receive a coupling shaft;
   a coupling shaft having a first end received in said receiving bore of said chuck;
   a welding barrel, which includes an axial bore and a welding tip, a second end of said coupling shaft received in said axial bore of said welder barrel; and
   means for activating said motor and said welding tip to weld a tube to the tube sheet with a circular weld.

9. A welding apparatus according to claim 8 wherein said chuck includes a plurality of receiving bores each of which is radially offset a different distance from said longitudinal axis of said chuck such that said welding apparatus is capable of forming circular welds of different diameters, with the selected weld diameters corresponding to the tube diameter.

10. A welding apparatus according to claim 8 further comprising a plurality of stabilizing guide members adjacent said welding tip to properly position and stabilize said tip relative to a tube and tube sheet during formation of a circular weld.

11. A welding apparatus according to claim 10, further comprising at least one depth guide to further ensure proper positioning of said welding tip relative to the tube and tube sheet during formation of a circular weld.

* * * * *